US006907869B2

(12) United States Patent
Burgess et al.

(10) Patent No.: US 6,907,869 B2
(45) Date of Patent: Jun. 21, 2005

(54) FILTER ELEMENT AND ASSEMBLY WITH CONTINUOUS DRAIN

(75) Inventors: Stephen F. Burgess, Cromwell, CT (US); Thomas M. Tomchak, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 21 days.

(21) Appl. No.: 10/714,062

(22) Filed: Nov. 14, 2003

(65) Prior Publication Data

US 2004/0173193 A1 Sep. 9, 2004

Related U.S. Application Data

(60) Provisional application No. 60/441,407, filed on Jan. 17, 2003.

(51) Int. Cl.[7] .............................................. F02B 25/06
(52) U.S. Cl. ..................................... 123/572; 123/573
(58) Field of Search ............................... 123/572–574, 123/41.86; 55/330, 385.3

(56) References Cited

U.S. PATENT DOCUMENTS

| 4,050,237 A | | 9/1977 | Pall et al. |
|---|---|---|---|
| 4,401,093 A | | 8/1983 | Gates, Jr. et al. |
| 4,409,950 A | * | 10/1983 | Goldberg ..................... 123/573 |
| 5,201,301 A | * | 4/1993 | Re ............................... 123/573 |
| 5,564,401 A | | 10/1996 | Dickson |
| 6,146,527 A | * | 11/2000 | Oelschlaegel ............... 210/232 |
| 6,161,529 A | | 12/2000 | Burgess |
| 6,261,333 B1 | * | 7/2001 | Dickson .................... 55/385.3 |
| 6,530,969 B2 | * | 3/2003 | Gieseke et al. ............... 55/330 |
| 2001/0054418 A1 | | 12/2001 | Burgess |
| 2002/0033009 A1 | | 3/2002 | Gieske et al. |

* cited by examiner

*Primary Examiner*—Marguerite McMahon
(74) *Attorney, Agent, or Firm*—Christopher H. Hunter (57) ABSTRACT

A closed crankcase emission control assembly for an internal combustion engine includes a filter assembly comprising a housing and a replaceable filter element. The filter element includes a ring of filter media; a first annular end cap sealed to one end of the media ring; a second end cap sealed to another end of the media ring; a cup-shaped valve pan fixed to the second end cap and which together therewith defines a sump container; and an opening with a lip seal in the valve pan which closely receives a standpipe from the housing to allow continuous drainage of oil collected by the filter element. The filter housing includes an inlet port to receive blow-by gasses from the engine crankcase, and an outlet port to provide the substantially oil and particulate free gasses to an induction system (e.g. a turbocharger) and back to the engine crankcase.

27 Claims, 4 Drawing Sheets

FILTER ELEMENT AND ASSEMBLY WITH CONTINUOUS DRAIN

CROSS-REFERENCE TO RELATED CASES

The present application claims the benefit of the filing date of U.S. Provisional Application Ser. No. 60/441,407; filed Jan. 17, 2003, the disclosure of which is expressly incorporated herein by reference.

FIELD OF THE INVENTION

The present invention is directed to a filter element and assembly for a crankcase emission control system. The crankcase emission control system is useful for a heavy internal combustion engine, such as a diesel engine.

BACKGROUND OF THE INVENTION

Emission controls for internal combustion engines have become increasingly important as concerns over environmental damage and pollution have risen—prompting legislators to pass more stringent emission control laws. Much progress has been made in improving exhaust emission controls. However, crankcase emission controls have been largely neglected.

Crankcase emissions result from gas escaping past piston rings of an internal combustion engine and entering the crankcase due to high pressure in the cylinders during compression and combustion. As the blow-by gas passes through the crankcase and out the breather, it becomes contaminated with oil mist. Crankcase emissions also contain wear particles and air/fuel emissions. Only a small number of heavy diesel engines have crankcase emission controls. Some current production diesel engines discharge these crankcase emissions to the atmosphere through a draft tube or similar breather vent contributing to air pollution. Some of the crankcase emissions are drawn into the engine intake system causing internal engine contamination and loss of efficiency.

The released oily crankcase emissions coat engine sites, such as the inside of engine compartments or chambers, fouling expensive components and increasing costs, such as clean-up, maintenance and repair costs. As the oily residue builds up on critical engine components, such as radiator cores, turbocharger blades, intercoolers and air filters, it becomes a "magnet" for dust, grit and other airborne contaminants. Particulates in the contaminated oily crankcase emissions include particles and aerosols. The accumulation of the particulates on these components reduces efficiency, performance and reliability of the engine.

In addition to increasing engine performance and decreasing maintenance intervals and site/critical engine component contamination, crankcase emission controls are becoming increasingly important in reducing air pollution. Engine emissions include both crankcase and exhaust emissions. Because of reductions in exhaust emissions, the percentage of the total engine emissions due to crankcase emissions has risen. Therefore, reducing crankcase emissions provides a greater environmental impact with engines having low exhaust emissions.

Furthermore, most of the crankcase particulate emissions (CPE) are soluble hydrocarbons, as opposed to the exhaust emissions that are mainly insoluble organics. The crankcase particulate emissions are oil related, with ethylene ($C_2H_4$) being predominant. Therefore, separating the oil and returning the cleaned oil free crankcase emissions to the engine inlet for combustion increases engine efficiency.

Crankcase flow and particulate emissions increase dramatically with engine life and operating time. Thus, the environmental impact and engine efficiency from recycling the crankcase emissions increase with operating time. For example, in buses having diesel engines, the crankcase particulate emissions represent as much as 50% of the total exhaust particulate emissions.

Crankcase emission control systems filter the crankcase particulate emissions and separate the oil mist from the crankcase fumes. The separated oil is collected for periodic disposal or return to the crankcase.

Crankcase emission control systems may be "open" or "closed" systems. In open crankcase emission control systems, the cleaned gases are vented to the atmosphere. Although open systems have been acceptable in many markets, they pollute the air by venting emission to the atmosphere and can suffer from low efficiency. Closed systems eliminate crankcase emissions to the atmosphere, meet strict environmental regulations, and eliminate site and external critical component contamination.

In closed crankcase emission control systems, the cleaned gases are returned to the engine combustion inlet. One of the first closed systems by Diesel Research, Inc. of Hampton Bays, N.Y., included a two-component crankcase pressure regulator and a separate filter.

Closed crankcase emission control systems require a high efficiency filter and crankcase pressure regulator. The high efficiency filter is required to filter out small sized particles to prevent contamination of turbochargers, aftercooler, and internal engine components. The pressure regulator maintains acceptable levels of crankcase pressure over a wide range of crankcase gas flow and inlet restrictions.

In a closed system, the crankcase breather is connected to the inlet of the closed crankcase emission control system. The outlet of the closed crankcase emission control system is connected to the engine air inlet, where the filtered blow-by gas is recycled through the combustion process.

A recent improvement to closed crankcase emission control systems is shown in U.S. Pat. No. 5,564,401, which is also owned by Diesel Research, Inc. In this system, a pressure control assembly and a filter are integrated into a single, compact, crankcase emission control assembly. The pressure control assembly is located in a housing body and is configured to regulate pressure through the system as well as agglomerate particles suspended in the blow-by gasses. Inlet and outlet ports direct the blow-by gasses into and out of the housing body from the engine block. A filter housing enclosing a replaceable filter element is removeably attached to the housing body to separate any remaining oil from the blow-by gasses. The filter element can be easily removed from the filter housing for replacement, after removing the filter housing from the housing body. The separated oil drains down and collects in a reservoir at the bottom of the filter housing. An oil drain check valve is located in the bottom wall of the filter housing, and includes a free-floating (one-way) valve. The check valve is connected through a separate return line to the oil pan or engine block to return the collected oil to the engine.

The crankcase emission control assembly shown in U.S. Pat. No. 5,564,401 provides a closed crankcase emission control system that is compact and combines various components into a single integrated unit, is efficient, and is simple and inexpensive to manufacture.

Nevertheless, it is believed there are certain disadvantages to the '401 assembly. The oil collecting on the inside surface of the media ring drains down onto the lower end cap, and then must make its way radially outward through the media, before it then drips down into the oil reservoir area for return to the engine. The return path through the media can be obstructed as the filter element becomes spent, which results in the oil being retained in the element and thereby less oil being returned to the engine crankcase. Spillage of the oil can occur during an element change, which can create handling issues.

The filter element in the '401 assembly may also be removed and replaced with less-preferred elements. This is because the filter element in the '401 assembly comprises a simple, ring-shaped media with a pair of end caps, which is available from a number of sources. However, less-preferred elements can suffer from poor performance, incorrect sizing, inappropriate material, etc. Replacing an approved filter element with a less-preferred element can reduce the oil-separating ability of the filter and, in extreme circumstances, possibly harm the engine.

A further improvement for a closed crankcase emission control system is shown in Burgess, U.S. Pat. No. 6,161,529, owned by the assignee of the present invention, where oil collected in the filter drains directly into a sump chamber (not through the filter media), and can be returned through a check valve to the engine. The check valve remains closed during engine operation (due to the pressure of the blow-by gasses) to prevent blow-by gasses from by-passing the element, and opens when the engine is shut down (due to the weight of the collected oil) to allow the oil to drain back to the crankcase. The oil drains back through the crankcase emissions line, which reduces the number of lines needed to and from the engine. The check valve is also integral with the filter element, and is thereby replaced at the same time the filter element is replaced.

While the Burgess emission control assembly has the benefits of being a single integrated unit, efficient, and simple and relatively inexpensive to manufacture, it is particularly designed for situations where the engine will be shut off for a period of time, to allow the collected oil to drain back to the engine. As indicated above, during engine operation, the check valve remains in a closed position, which is desirable to prevent gas by-pass of the element. The assembly is not designed to be operated continuously, as the oil can collect to a level where it begins to clog the media and prevent blow-by gasses from passing through the filter element. However, certain engines are operated continuously, for example, engines for power generation, and have not been able to take advantage of the benefits of the Burgess assembly.

Thus it is believed there is a demand for a further improved filter element and filter assembly for a closed crankcase emission control system which has at least some of the benefits of the Burgess assembly, but which can be used continuously to remove oil from blow-by gasses in the engine, and to direct oil-free gasses back to the engine. It is also believed there is a continuing demand for an improved closed crankcase emission control system that is compact and combines various components into a single integrated unit, is efficient, and is simple and inexpensive to manufacture.

SUMMARY OF THE PRESENT INVENTION

The present invention provides a novel and unique filter assembly and filter element for a crankcase emissions control system. The system can be used continuously to remove oil from blow-by gasses from the engine, and to direct essentially oil-free gasses back to the engine. The system is compact and combines various components into a single integrated unit, is efficient, and is simple and inexpensive to manufacture.

According to the present invention, the filter assembly includes a housing with a standpipe projecting axially upward from a lower portion of the housing, and defining a secondary drain port.

The filter element comprises a ring of filter media circumscribing a central cavity. The media ring has a first (upper) end and a second (lower) end. A first annular end cap is sealingly attached to the first end of the filter media ring, and has a central opening into the central cavity of the filter media ring. A second annular end cap is sealingly attached to the second end of the filter media ring. The second end cap also has a central opening into the central cavity of the filter media ring, and includes a short cylindrical collar bounding the opening and projecting upwardly into the central cavity.

A cup-shaped valve pan is fixed to the second end cap, and together with the second end cap defines a sump container integral with the filter element. The valve pan has a cylindrical sidewall and a bottom end wall. The bottom end wall includes a central circular opening, of a diameter slightly smaller than the diameter of the opening in the second end cap. A radial lip seal, preferably in one piece (unitary) with the second end cap, is provided around the opening in the end wall. The lip seal closely receives and seals to the standpipe when the filter element is located in the housing, The standpipe projects a predetermined distance axially upward through the lip seal and into the sump container.

Blow-by gasses pass through the filter element where oil is removed from the gasses. Oil separated by the filter element collects in the inner surface of the media ring and drains down and is collected by the second lower end cap, in the area surrounding the cylindrical collar. The oil collects on the second end cap until it rises to a level above the collar, at which point it drains down through the central opening in the second end cap, and after collecting to a level higher than the cylindrical collar in the second end cap, drains down into the sump container. The oil collects in the sump container until it reaches the level of the standpipe, where it then drains down through the standpipe and into a secondary drain line back to the engine. A one-way check valve is provided in the secondary drain line, proximate the engine, to prevent blow-by gasses from directly entering the drain line and by-passing the filter element.

The filter housing for the filter assembly has inlet and outlet ports, which direct the blow-by gasses from the crankcase emissions line through the filter media. The oil-free gasses pass through the housing and back to the engine air intake, while the oil collects and continuously drains back to the crankcase. The lip seal between the element and standpipe prevents gas by-pass of the element. The element can be easily removed from the housing when spent, and replaced.

A pressure control system can be provided with the emission control system to regulate pressure through the system, if necessary or desirable. The filter assembly preferably also incorporates a separate primary breather filter to initially separate heavy oil droplets from the blow-by gasses prior to the gasses entering the pressure control assembly and the crankcase filter. The oil collected from the primary breather filter drains back through a primary drain line to the crankcase.

The filter assembly and filter element of the present invention thereby can be used continuously to remove collected oil from the blow-by gasses in the engine, and provides a system that is compact and combines various components into a single integrated unit, is efficient, and is simple and inexpensive to manufacture.

Further features of the present invention will become apparent to those skilled in the art upon reviewing the following specification and attached drawings.

DETAILED DESCRIPTION OF THE PREFERRED EMBODIMENT

Figure 1:
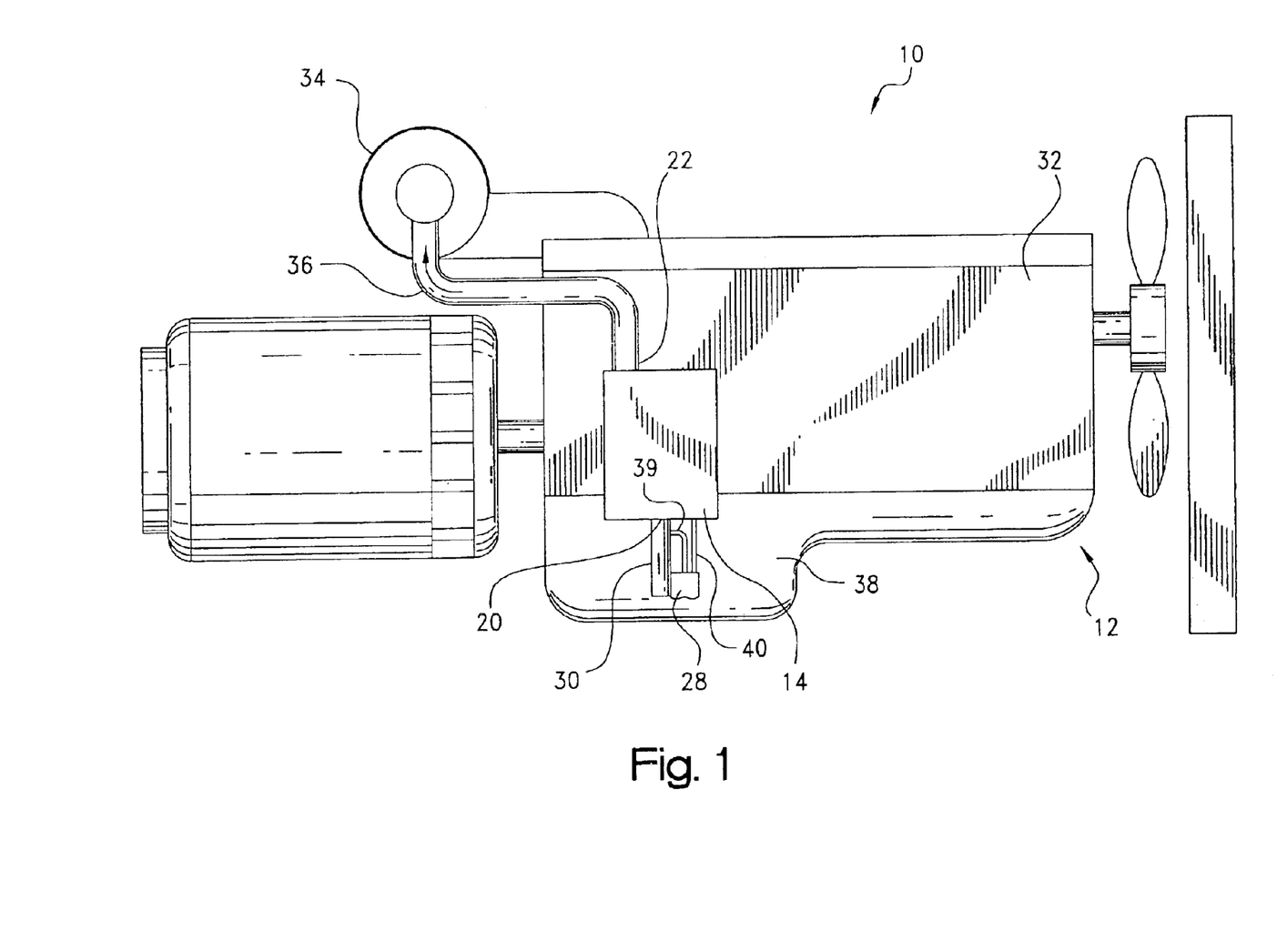
FIG. 1 is an illustration of an internal combustion engine having a closed crankcase emission control system according to the present invention.

Referring to the drawings, and initially to FIG. 1, a closed crankcase emission control system is indicated generally at 10. The system includes an internal combustion engine, indicated generally at 12, and an integrated crankcase emission control assembly 14. The integrated crankcase emission control assembly 14 includes a filter assembly, indicated generally at 15, and preferably a pressure regulator, indicated generally at 16, as will be described below.

The crankcase emission control assembly 14 has a gas inlet 20 and a gas outlet 22. The gas inlet 20 is connected to the engine crankcase breather 28 via an inlet hose 30 and receives contaminated oily gas from the engine crankcase 32. The crankcase emission control assembly 14 separates the contaminated oily gas, agglomerates small particulates to form larger particulates, and filters the large particulates.

The cleaned crankcase emissions exit from the gas outlet 22 and enter the engine air intake 34 for combustion via an outlet hose 36. The separated oil is returned to the oil pan 38 through a primary drain hose 39 and a secondary drain hose 40.

Figure 2:
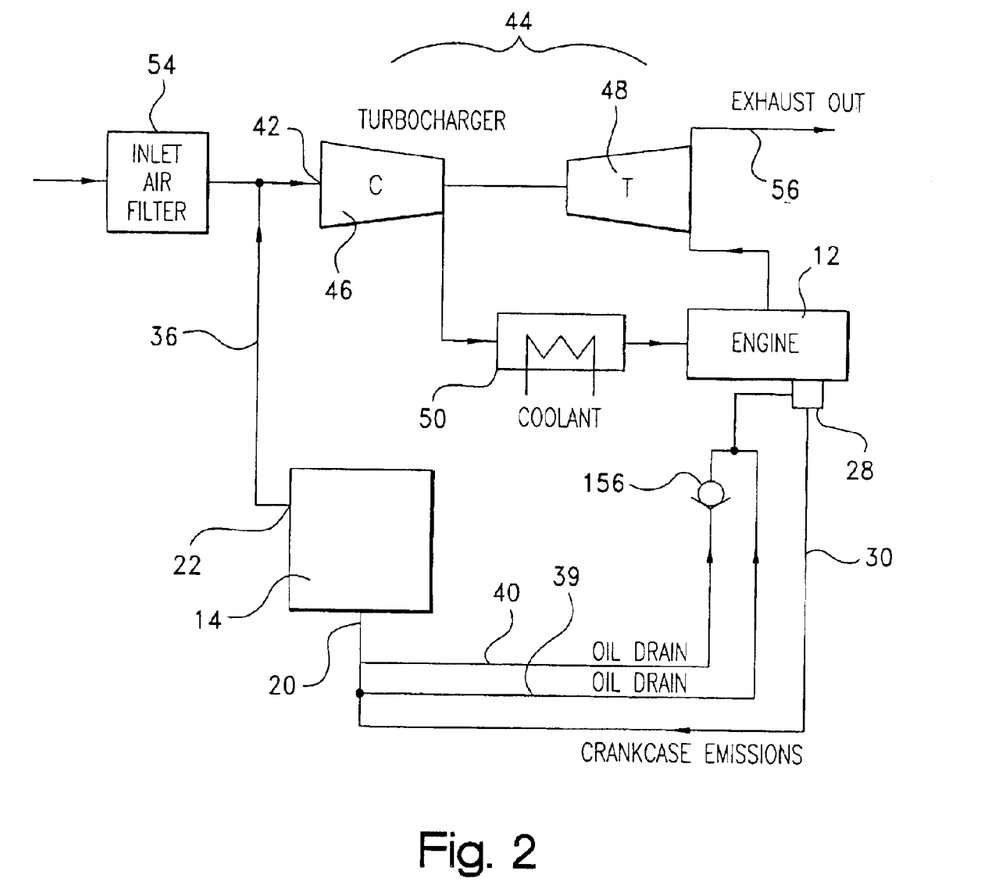
FIG. 2 is a block diagram representation of the closed crankcase emission control system shown in FIG. 1.

FIG. 2 is a block diagram representation of FIG. 1, wherein the cleaned crankcase emissions enter an induction system such as the air intake 42 of a turbocharger system, indicated generally at 44. The turbocharger system includes a compressor 46, a turbocharger 48, and an aftercooler 50. The engine also receives clean air through a silencer filter 54, while the exhaust manifold (not shown) of the engine and the turbocharger 48 are coupled to an exhaust line 56.

Figure 3:
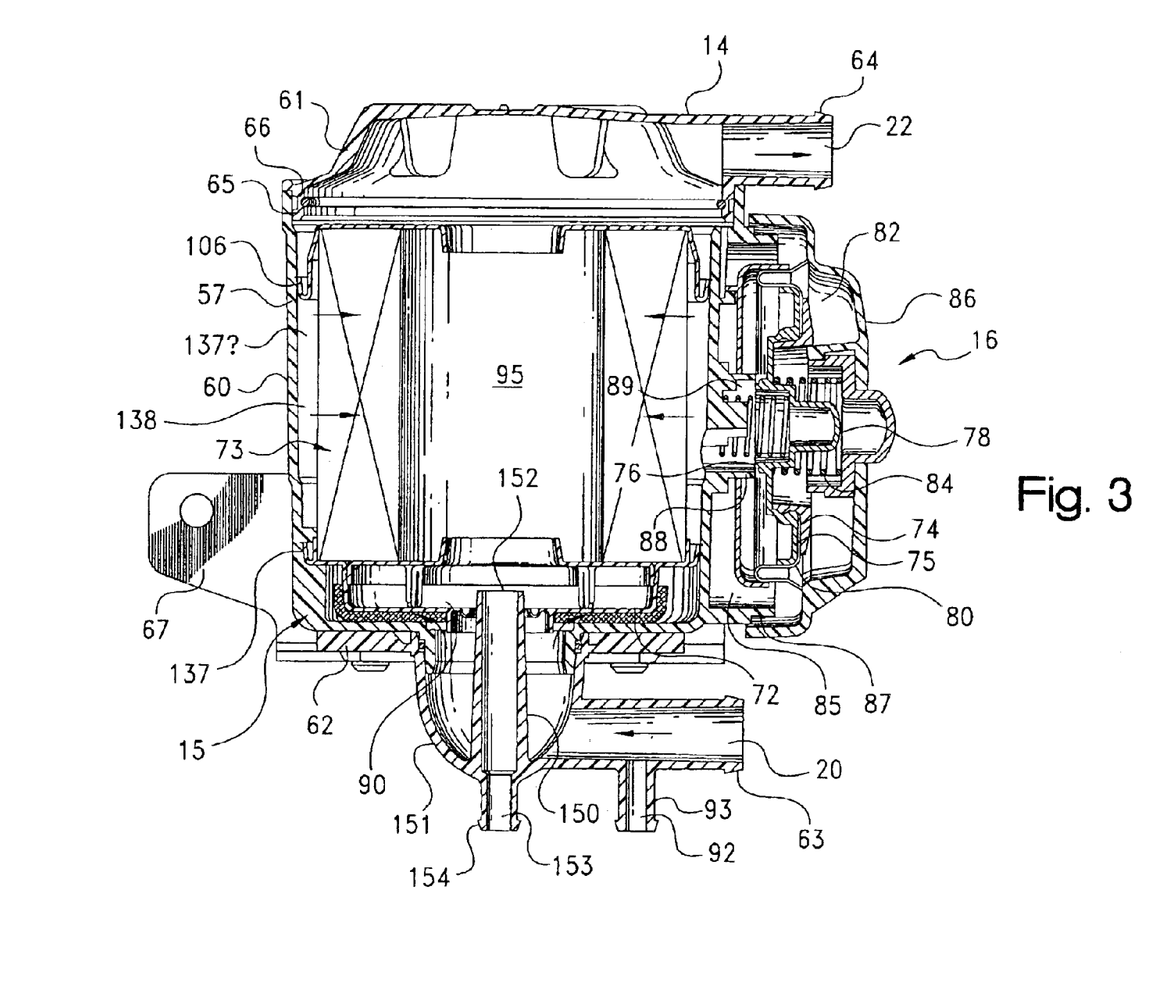
FIG. 3 is a cross-sectional side view of a closed crankcase emission control system with a filter assembly constructed according to the present invention.

FIG. 3 shows a cross-section of the crankcase emission control assembly 14 for the engine. The crankcase emission control assembly 14 includes a housing 57 including a cylindrical sidewall 60 and a removable cover 61. The gas inlet 20 is located in a bottom wall 62 of the sidewall 60, while the gas outlet 22 is located in cover 61, although it is noted the inlet and outlet could be located at any appropriate location on the housing. The gas inlet 20 and gas outlet 22 preferably include conventional barbed fittings 63, 64, respectively, to facilitate attachment of appropriate inlet and outlet hoses. The sidewall 60 and cover 61 of housing 57 are preferably formed from material appropriate for the particular application, for example, plastic.

Cover 61 is removably attached to sidewall 60 in an appropriate manner. For example, cover 61 may have a downwardly-extending cylindrical flange 65 with outwardly-directed threads, which mate with inwardly-directed threads at the upper end 66 of housing 14. In this manner, the cover 61 can be easily screwed onto or off of the sidewall 60 to provide access to the filter assembly 15. The housing can include appropriate attachment flanges as at 67 to allow the crankcase emission control assembly to be mounted at an appropriate location on the engine.

The pressure control assembly 16 for the emission control assembly acts as a pressure regulator and an inertial separator and agglomerator for the blow-by gasses received from the engine. The filter assembly 15 also separates oil suspended in the blow-by gasses, and includes a primary breather filter 72 for separating heavy oil droplets before the blow-by gasses reach the pressure control assembly 16; and a crankcase filter, indicated generally at 73, for separating any remaining smaller droplets after the gasses have passed through the primary breather filter 72 and pressure control assembly 70, as well as any particulate matter in the gasses.

The pressure control assembly 16 is mounted on the side of housing 14 and comprises a valve having a valve body 74 connected to a valve head 75. In turn, the valve head 75 is connected to a valve plug 76. A valve guide 78 is connected to the valve plug 76. An annular rolling diaphragm 80 is located circumferentially around the valve body 74. The diaphragm 80 separates the valve body 74 from an annular chamber 82 that is vented to the atmosphere. A coil spring 84 is located around the valve plug 76, between the valve body 74 and a lower surface of an annular inlet chamber 85. The valve body 74, valve head 75, valve plug 76, valve guide 78, diaphragm 80 and coil spring 84 are enclosed between a cover 86 and a cylindrical flange 87 formed in one piece with sidewall 60. Diaphragm 80 serves as a fluid seal between cover 86 and flange 87.

The inlet chamber 85 of the pressure control assembly 16 is fluidly connected to gas inlet 20 through breather filter 72. In addition, an opening of a cylindrical body channel 88 is located at the center of the inlet chamber 85. Body channel 88 defines an outlet passage 89 from the pressure control assembly to the crankcase filter 73, and consequently to gas outlet 22. The valve guide 78 is located within the body channel 88.

The body channel 88 has an outer end defining a valve seat opposite the valve plug 76. The valve seat of channel 88, combined with the valve plug 76 and valve head 74, define a variable orifice of an inertial separator and agglomerator. The valve plug 76 is moved toward and away from the valve seat of channel 88, depending upon the pressure received through the gas inlet 20. The pressure control assembly 16 keeps the pressure in the inlet chamber 85 and engine crankcase constant. Oil droplets impinge upon valve plug 76, collect, and then drip down toward the bottom of the housing 14. Additional detail of the pressure control assembly can be found in U.S. Pat. No. 5,564,401, which is incorporated herein by reference.

The breather filter 72 of the filter assembly 15 comprises an annular filter media formed of appropriate material (e.g., steel mesh) that is supported at the bottom end of the sidewall 60. The breather filter is typically fixed within the housing in an appropriate manner, and is typically not replaced, or at least not replaced at the intervals typically found with the crankcase filter 73. The breather filter has a central opening 90 allowing unobstructed access to gas inlet 20. Blow-by gasses entering gas inlet 20 initially pass radially outward through the breather filter 72, where heavy oil droplet are removed in the breather filter, collect, and then drain downwardly through gas inlet 20 and drain line 39 back to the engine. The blow-by gasses then pass to inlet chamber 85 of the pressure control assembly, and through the pressure control assembly to crankcase filter 73. As described above, some of the remaining oil suspended in the blow-by gasses collects on the valve plug 76, drips downwardly, and drains through the large mesh structure of filter breather 72, and then through gas inlet 20 and drain line 39 back to the engine. Inlet 20 preferably includes a primary drain port 92 including a conventional barbed fitting 93 to allow connection of drain line 39.

Figure 4:
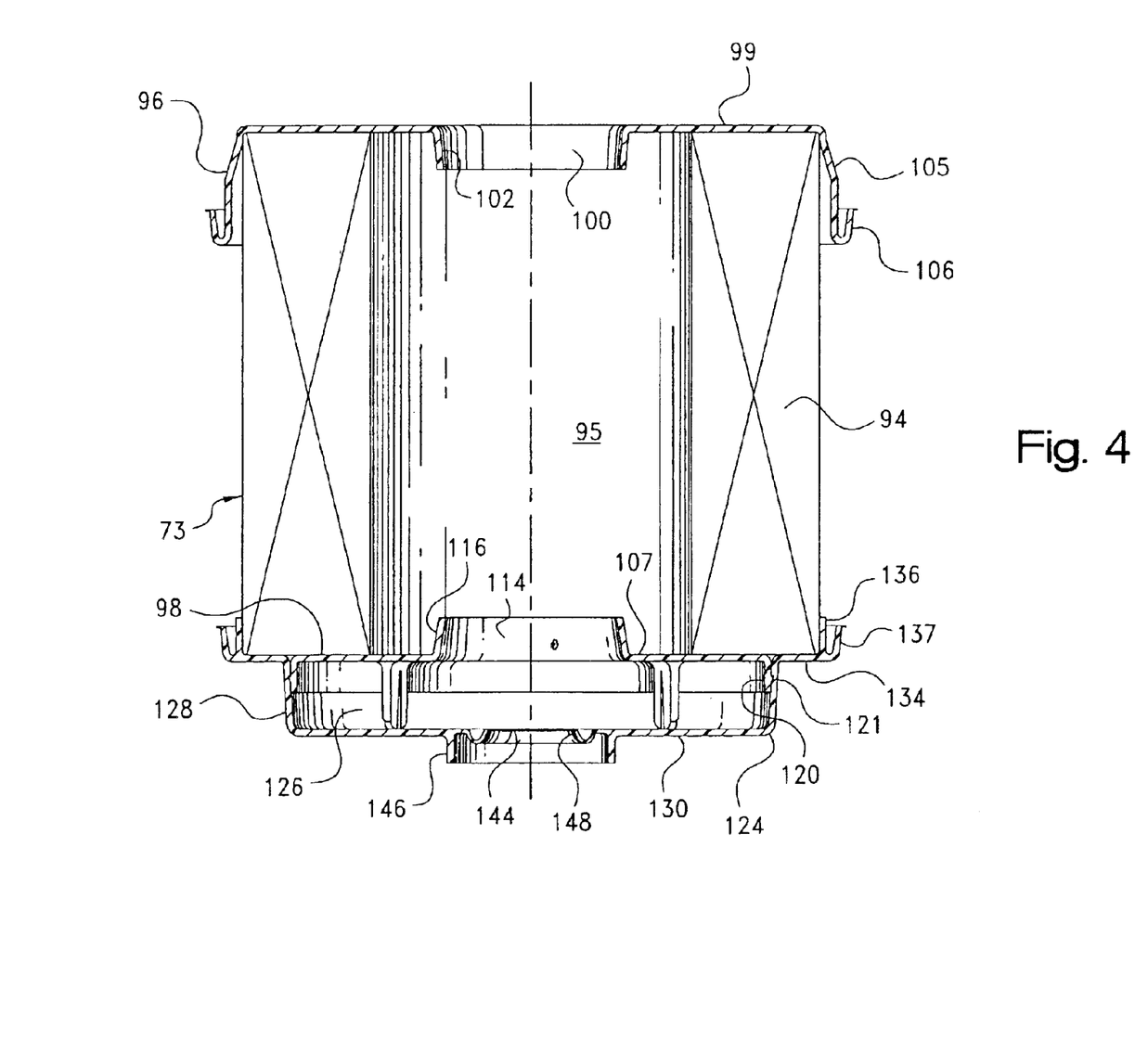
FIG. 4 is a cross-sectional side view of the filter element for the filter assembly of FIG. 3.

The blow-by gasses with any remaining suspended oil (and particulate matter) then pass radially inward through crankcase filter 73. Referring now to FIG. 4, the crankcase filter 73 preferably comprises a replaceable filter element having a ring of filter media 94 circumscribing a central cavity 95. The ring of filter media can be formed from any material and in any manner appropriate for the particular application. Typically, the media is formed from a fibrous material, and is axially pleated. First and second impermeable end caps 96, 98 are provided at opposite end of the media, and are sealingly bonded thereto with an appropriate adhesive or potting compound. End caps 96, 98 are likewise formed from any material and in any manner appropriate for the particular application. Typically the end caps are formed from plastic, and are molded.

First (upper) end cap 96 has an annular body portion 99 defining a central opening 100. The upper end cap 96 includes a cylindrical collar 102 preferably unitary with the annular body portion 99, inwardly bounding opening 100, and projecting a short distance axially inward/downward into central cavity 95.

The first end cap 96 also has a short, relatively rigid, cylindrical skirt 105, preferably unitary with and outwardly bounding the annular body portion 99, and projecting a short distance axially away from the body portion along the outer periphery of the filter media toward the other end cap 98. Skirt 105 includes a radially-outward directed resilient annular lip seal 106, preferably formed in one piece (unitarily) with the distal end of skirt 105 and providing a fluid seal between the end cap 96 and the sidewall 60 when the element 73 is installed in housing 57. Other sealing means could be provided between end cap 96 and sidewall 60, such as for example, an annular groove or channel can be provided in skirt 105 to support a resilient O-ring.

The second end cap 98 also has an annular body portion 107 defining a central opening 114. A short cylindrical collar 116, preferably unitary with body portion 107 and inwardly bounding opening 114, projects axially inward/upward a short distance into central cavity 95. A short cylindrical portion 120, also preferably formed unitary with body portion 107, extends downwardly away from the second end cap at a location bounding the outer periphery of the end cap. Cylinder 120 includes an annular, radially-outward projecting catch or barb 121 around the outer circumference of the cylinder, toward its lower distal end.

A cup-shaped valve pan 124 is fixed to the second end cap 98, and together with the second end cap, defines a sump container, indicated generally at 126. Valve pan 124 has a cylindrical sidewall 128 and an integral (and preferably unitary) end wall 130, and is formed preferably from the same material as end caps 96, 98 (i.e., plastic). Cylindrical sidewall 128 closely receives the cylinder portion 120 of second end cap 98, and includes an annular groove or channel which receives catch 122 on cylinder portion 120 to enable the valve pan 124 to be easily assembled and permanently retained with second end cap 98. Sidewall 128 of valve pan 124 can alternatively be fixed to second end cap 98 by other appropriate means, such as with an adhesive or by sonic welding; or could be formed unitarily (in one piece) with second end cap 98.

Valve pan 124 further includes a radially-outwardly projecting rigid annular flange 134 at the upper end of the sidewall 128, which is supported against the lower end of media 94, radially outward from cylinder 120.

A short cylindrical flange 136 projects axially upward around the periphery of flange 134 along the outer periphery of the filter media toward the other end cap 96. A short, resilient annular skirt 137, preferably formed unitary with flange 134, and radially outwardly spaced from flange 136, also projects axially upward and radially outward from flange 134 to define a second fluid seal with sidewall 60. As with seal 106, other sealing means could be provided between end cap 98 and sidewall 60, such as for example, an annular groove or channel can be provided in flange 134 or skirt 137 to support a resilient O-ring. Alternatively, seal 137 can be carried by end cap 98, or by cooperation between end cap 98 and valve pan 124.

When filter element 73 is located in the housing, side seals 106 and 137, bounding the filter element, fluidly seal against sidewall 60 on opposite axial sides of opening 89. A peripheral chamber 138 (FIG. 3) is thereby defined between the crankcase filter 73 and the sidewall 60 of the housing. Gasses passing through pressure control assembly 16 must thereby enter the peripheral chamber 138 and pass radially inward through media 94, without bypassing the element. Any oil remaining in the gasses is separated by the media 94, and collects on the inside surface of the media in central cavity 95. The oil then drips down into the area between the filter media 94 and the cylinder 116 of the lower end cap 98. The oil eventually collects above the level of the cylinder, at which point it then drips downwardly into the sump container 126 and is contained by the valve pan 124. The length of cylinder 116 is chosen depending on the desired amount of oil to be collected in the lower end cap (which necessarily also collects in the media).

The sump container 124 further includes a central circular opening 144 in bottom end wall 130. Opening 144 preferably has a slightly smaller diameter than opening 114 in end cap 98 A cylindrical flange 146 bounds and is radially outwardly spaced from opening 144 and projects axially downward/outward a short distance from end wall 130. Flange 146 facilitates locating and supporting element 73 in housing 57. A resilient annular seal 148 is also provided with end wall 130 bounding opening 144, and projecting radially inward into the opening. Preferably seal 148 is a lip seal formed unitary with wall 130, although it could also be a separate sealing means, such as an O-ring supported within a groove or channel in the wall portion bounding opening 144. Preferably the lip seal is co-planar or essentially co-planar with end wall 130, to facilitate manufacturing, although it could also be axially offset, in a plane parallel to end wall 130.

Referring now to FIG. 3, a cylindrical standpipe 150 is provided with filter housing 57, preferably in one piece (unitary) with lower end wall 62. Standpipe 150 projects axially upward from end wall 62 and is closely received in opening 144 of filter element 73, with lip seal 148 providing a fluid seal with the standpipe. End wall 62 of housing 57 has a cup-shaped portion 151 permitting blow-by gasses entering inlet 20 to pass around standpipe 150 and enter breather filter 72.

Standpipe 150 has an axial length sufficient to project through lip seal 148, and preferably a length which extends a short distance inwardly into container 126 beyond the lip seal, such that oil dripping down through opening 114 in end cap 98 collects in container 126 in the valve pan around the standpipe. The oil eventually collects to the level of the open upper end of the standpipe and starts draining down through the standpipe. The length of standpipe 150 is chosen depending on the desired collection of oil in the valve pan. The standpipe 150 includes a secondary drain port 152 at the distal, exterior end of the standpipe, and a conventional barbed fitting 154 is provided at the secondary drain port to enable connection to drain line 40. Thus, the draining oil will pass via line 40 back to the drain pan of the engine. Lip seal 148 prevents leakage between the blow-by gasses in inlet 20 and oil dripping down through standpipe 150.

Preferably a one-way check valve 156 (FIG. 2) is provided in drain line 40, proximate engine 12, to prevent blow-by gasses from passing the reverse direction through drain line 40, and by-passing the filter element. The location of check valve 156 is chosen such that the pressure of the collected oil upstream of the valve will overcome the pressure of the blow-by gasses downstream of the valve to allow the collected oil to continuously drain back to the drain pan of the engine.

During operation of the engine 12 (FIG. 1), the engine air intake 34 or the turbo air intake 42 (FIG. 2) of a turbocharged engine, which is connected to the gas outlet 22, creates a vacuum in the central cavity 95 of the crankcase filter 73. The pressure control assembly 70 keeps the pressure in the gas inlet 20 and engine crankcase constant. In addition, as indicated above, the breather filter initially separates larger oil droplets, while oil in the blow-by gasses also coats the valve plug 76. Remaining oil is separated by the media, and drains down through the standpipe. The collected oil is returned to the engine either via drain line 39 or 40.

Because oil is removed in the breather filter 72 as well as in the pressure control assembly 70, a fine filter media capable of filtering very fine particulates is not needed for the crankcase filter 73. Instead, efficient filtering is obtained using a coarser filter media with less pressure drop. The coarser filter is less expensive than fine filters, clogs less often, and requires less pressure drop for effective filtration. Thus, cost is reduced and maintenance intervals to replace the filter are increased. In addition, a large pressure drop for proper filtration is not required.

Particulate and oil-free crankcase emissions leave the filter media 73 and exit through the gas outlet 22. The cleaned crankcase emissions are then provided to the engine air intake 34 (FIG. 1) or the turbo air intake 42 (FIG. 2) for combustion.

The crankcase emission control assembly of the present invention thereby overcomes many of the drawbacks of prior systems. Oil collected in the filter drains directly into a sump container (not through the filter media), and is returned to the engine. The filter assembly and element can be used continuously to remove oil from blow-by gasses in the engine, and to direct essentially oil-free (and particulate free) gasses back to the engine. The replacement of the unique filter element can also be controlled, which ensures that only filter elements meeting the proper standards of quality and performance are used in the assembly. The filter assembly and element are used in an emissions control assembly to provide a system that is compact and combines various components into a single integrated unit, is efficient, and is simple and inexpensive to manufacture.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A replaceable filter element for a crankcase emission control assembly, the replaceable filter element comprising:
   a ring of filter media circumscribing a central cavity and having a first end and a second end;
   a first annular end cap sealingly attached to the first end of the filter media ring, said first end cap having a central opening into the central cavity of the filter media ring;
   a second annular end cap sealingly attached to the second end of the filter media ring, said second end cap also having a central opening into the central cavity of the filter media ring, and
   a cup-shaped valve pan fixed to the second end cap and defining therewith a sump container in fluid communication with the central cavity of the filter media ring; the valve pan having an end wall and a further central opening; and a resilient seal bounding the opening in the end wall of the valve pan.

2. The replaceable filter element as in claim 1, wherein the opening in the end wall of the valve pan is circular, and the seal radially inwardly bounds the opening.

3. The replaceable filter element as in claim 2, wherein the seal projects radially inward from the end wall into the opening.

4. The replaceable filter element as in claim 3, wherein the seal is co-planar with the end wall.

5. The replaceable filter element as in claim 1, wherein the seal is a lip seal.

6. The replaceable filter element as in claim 1, wherein the seal is unitary with the end wall.

7. The replaceable filter element as in claim 1, wherein the valve pan also includes a cylindrical sidewall fixed to the second end cap, and the end wall is planar.

8. The replaceable filter element as in claim 1, further including first and second annular side seals bounding the element at axially separated locations along the filter element.

9. The replaceable filter element as in claim 8, wherein the first side seal is integral with the first end cap, and the second side seal is integral with the valve pan.

10. The replaceable filter element as in claim 1, further including a cylindrical collar bounding the opening in the end wall of the valve pan and projecting outwardly, away from the valve pan and the filter element.

11. The replaceable filter element as in claim 10, wherein the collar is radially outwardly spaced from the seal.

12. The replaceable filter element as in claim 1, wherein the opening in the second end cap has a greater diameter than the opening in the end wall of the valve pan.

13. The replaceable filter element as in claim 1, further including a collar integral with the second end cap, bounding the central opening in the second end cap, and projecting axially inward into the central cavity.

14. A filter for a crankcase emission control assembly, the filter comprising:
   a ring of filter media circumscribing a central cavity and having a first end and a second end;

a first end cap sealingly attached to the first end of the filter media ring, said first end cap having a central opening into the central cavity of the filter media ring;

a second end cap sealingly attached to the second end of the filter media ring, said second end cap having a central opening into the central cavity of the filter media ring, a sump container integral with the second end of the filter media ring and independent from the housing of the crankcase emission control assembly, the sump container in fluid communication with the central cavity of the filter media ring through the central opening in the second end cap; an end wall in the sump container; the end wall including a further central opening, and a resilient radial seal bounding the opening in the end wall of the sump container; and wherein the filter is an integral unit and can be removed from the crankcase emission control assembly.

15. The filter as in claim 14, further including first and second annular side seals bounding the element at axially separate locations along the filter element, wherein the first side seal is integral with the first end cap, and the second side seal is integral with the sump container.

16. The filter as in claim 14, further including a cylindrical collar bounding the opening in the end wall of the sump container and projecting outwardly, away from the filter element.

17. The filter as in claim 14, wherein the opening in the second end cap has a greater diameter than the opening in the end wall of the sump container.

18. The filter as in claim 17, further including a collar integral with the second end cap, bounding the central opening in the second end cap, and projecting axially inward into the central cavity.

19. A crankcase emission control assembly, including a housing having a first port receiving blow-by gasses from an engine crankcase, a second port directing substantially oil-free gasses back to the engine crankcase, and a standpipe projecting axially upward from a lower portion of the housing toward an upper portion of the housing; a filter assembly in the housing removing suspended oil in the gasses as the gasses pass from the first port to the second port, the filter assembly including a filter element having an integral sump container collecting the oil when the oil is separated from the gasses, and an opening in the sump container with a resilient seal which closely receives the standpipe and seals with the standpipe to normally prevent blow-by gasses received in the first port from directly entering the sump container and by-passing the filter element, wherein collected oil in the sump container can drain through the standpipe when the oil collects in the sump container up to a level above an open end of the standpipe.

20. The crankcase emission control assembly as in claim 19, further including a drain port in the housing fluidly connected to the standpipe.

21. The crankcase emission control assembly as in claim 20, wherein the filter element is removably received in the housing and the filter assembly further includes a primary breather filter fixed in the housing.

22. The crankcase emission control assembly as in claim 21, wherein the housing includes a cylindrical sidewall and a removable cover allowing removal and replacement of the filter element from the housing.

23. The crankcase emission control assembly as in claim 19, wherein the filter element includes:

a ring of filter media circumscribing a central cavity and having a first end and a second end;

a first end cap sealingly attached to the first end of the filter media ring, said first end cap having a central opening into the central cavity of the filter media ring;

a second end cap sealingly attached to the second end of the filter media ring, said second end cap having a central opening into the central cavity of the filter media ring, wherein the sump container is defined at least in part by the second end cap of the filter element, and the sump container is in fluid communication with the central cavity of the filter media ring through the central opening in the second end cap.

24. The crankcase emission control assembly as in claim 23, further including a first annular resilient seal carried around the periphery of the first end cap for sealing with one portion of the housing, and a second annular resilient seal carried around the periphery of the sump container for sealing with another portion of the housing.

25. The crankcase emission control assembly as in claim 24, wherein the housing includes a cylindrical sidewall and a bottom wall, with the first port being provided centrally in the bottom wall, and the breather filter comprises an annular media member disposed toward the bottom of the housing with a central opening in surrounding relation to the first port, the blow-by gasses entering the first port passing radially-outward through the breather filter to the filter element, wherein the breather filter separates at least some of the suspended oil from the blow-by gasses entering the first port and the separated oil can then drain back through the first port to the engine crankcase.

26. The crankcase emission control assembly as in claim 25, wherein the replaceable filter element is positioned in the housing such that the sump container is toward the bottom of the filter element and adjacent the breather filter.

27. The crankcase emission control assembly as in claim 26, further including a peripheral chamber surrounding the filter element, wherein the blow-by gasses passing through the breather filter pass into the peripheral chamber and then flow radially inward through the filter element where substantially the remainder of the suspended oil is separated from the blow-by gasses, the remaining oil collecting in the sump chamber and being returned to the engine crankcase.

* * * * *